United States Patent
Essers et al.

(10) Patent No.: US 12,240,965 B2
(45) Date of Patent: *Mar. 4, 2025

(54) POLYMER COMPOSITION FOR IMPROVED GRADE PLASTICS FROM RECYCLED MATERIAL

(71) Applicant: QCP HOLDING B.V., Geleen (NL)

(72) Inventors: Franciscus Elisabeth Jacobus Essers, Geleen (NL); Martinus Hendrikus Maria Van Enckevort, Geleen (NL); Marc Peter August Houtermans, Geleen (NL); Johannes Venerius, Geleen (NL)

(73) Assignee: QCP Holding B.V., Geleen (NL)

( * ) Notice: Subject to any disclaimer, the term of this patent is extended or adjusted under 35 U.S.C. 154(b) by 721 days.

This patent is subject to a terminal disclaimer.

(21) Appl. No.: 17/607,476

(22) PCT Filed: Apr. 28, 2020

(86) PCT No.: PCT/EP2020/061780
§ 371 (c)(1),
(2) Date: Oct. 29, 2021

(87) PCT Pub. No.: WO2020/221755
PCT Pub. Date: Nov. 5, 2020

(65) Prior Publication Data
US 2022/0204738 A1 Jun. 30, 2022

(30) Foreign Application Priority Data
Apr. 29, 2019 (EP) ..................................... 19171593

(51) Int. Cl.
| C08L 23/12 | (2006.01) |
| B29C 45/00 | (2006.01) |
| B29K 23/00 | (2006.01) |
| B29K 105/26 | (2006.01) |

(52) U.S. Cl.
CPC .......... C08L 23/12 (2013.01); B29C 45/0001 (2013.01); B29K 2023/12 (2013.01); B29K 2105/26 (2013.01); C08L 2203/30 (2013.01); C08L 2205/025 (2013.01); C08L 2205/03 (2013.01); C08L 2207/20 (2013.01)

(58) Field of Classification Search
CPC ................. C08L 23/12; C08L 2203/30; C08L 2205/025; C08L 2205/03; C08L 2207/20; B29C 45/0001; B29K 2023/12; B29K 2105/26

USPC ........................................................ 521/47
See application file for complete search history.

(56) References Cited

U.S. PATENT DOCUMENTS

| 9,290,646 B2 * | 3/2016 | Glogovsky ......... C08L 23/0807 |
| 10,975,228 B2 * | 4/2021 | Herring .................. C08L 23/12 |
| 2002/0037954 A1 * | 3/2002 | Ohkawa .................. C08L 23/10 524/451 |
| 2015/0099840 A1 * | 4/2015 | Glogovsky ............. C08L 23/16 524/400 |
| 2016/0136853 A1 * | 5/2016 | DiNunzio ............... B29C 48/78 524/427 |
| 2018/0186971 A1 * | 7/2018 | Herring .................... B29B 7/90 |

FOREIGN PATENT DOCUMENTS

| CN | 101798423 A | 8/2010 | |
| CN | 113195619 A * | 7/2021 | ............. C08L 23/06 |
| WO | 2014147106 A2 | 9/2014 | |

OTHER PUBLICATIONS

Chinese Office Action dated Feb. 2, 2023 for family member Application No. 202080032462.5.
Getao et al, Production technology of functional plastic masterbatch, 1st edition in Jun. 2006, pp. 1-4.
Liu Ruixue, Polymer materials, 1st edition in Sep. 2018, pp. 1-10.
Luo Hesheng, Plastic Material Manual, 3rd edition in Mar. 2010. pp. 1-9.
Dingtong et al., China Chemical Products Collection, 1st edition in Oct. 1994, pp. 1-8.
Lou Chunhua et al., Introduction to Polymer Science, Version 1, Apr. 2013, pp. 1-18.
Xiao Jiumei, A new idea of energy saving and carbon reduction of waste plastic packaging modified blending regeneration, 2014, pp. 1-23.

* cited by examiner

*Primary Examiner* — Michael M. Bernshteyn

(57) ABSTRACT

A polymer composition including:
  a. 75-90 wt % of a recycled polypropylene;
  b. 1-20 wt % of a polyolefin elastomer (POE);
  c. 0-10 wt % of a styrene ethylene butylene styrene block copolymer (SEBS);
  d. 2-20 wt % of talcum;
wherein the amount of POE and SEBS is at least 3.5 wt %, preferably between 5 and 20 wt %, and
wherein the wt % is relative to the total weight of the polymer composition.

16 Claims, No Drawings

POLYMER COMPOSITION FOR IMPROVED GRADE PLASTICS FROM RECYCLED MATERIAL

FIELD OF THE INVENTION

The present invention relates to an improved polymer composition containing a high amount of recycled polypropylene (PP). As well as to the use of such polymer composition in the manufacturing of articles, the articles manufactured from said polymer composition and to the process of preparing such polymer composition.

BACKGROUND OF THE INVENTION

The omnipresence of plastic packaging and the importance of environmental policy have led to the increased importance of recycled plastic materials. The recycling of paper, textiles, glass or metals is already carried out on a large scale, whether by separate collection or by sorting of the recyclate. The recycling of plastic waste and re-use of plastics is also increasing.

Virgin polymer composition replacement is considered to represent the only way forward to solve the global plastic waste problem, to stop the depletion of natural resources, and to facilitate a circular economy.

To-date recycled polymer compositions are available, in the form of flakes or granules, that are obtained from the collection of PP packaging, containers or films are available on the market, wherein the recycled PP is present within the recycled polymer composition at a low percentage of between 5-8 wt % and the remaining between 92-95 wt % of PP are made-up of virgin PP.

The aim of the invention is to produce a polymer composition containing a high amount of recycled PP that can compete with virgin material with respect to product performance and price. To-date polymer compositions of recycled PP cannot compete with the impact strength and stiffness of virgin PP polymer compositions.

The currently available polymer compositions of recycled PP suffer from polystyrene contaminants, rubber contaminants and variability and poor consistency of the recycled plastic feeds.

Subsequently the currently available polymer compositions of recycled PP have a low impact strength and stiffness when compared to virgin materials.

It is a further aim of the invention to produce a polymer composition of recycled PP that can be used to manufacture blow-molded and injection molded packaging as well as durable products without need for further blending with virgin PP material.

There is currently no known polymer composition containing a high percentage of recycled PP (at least 76 wt %, preferably 80 wt %, most preferably 85 wt %, of PP that is from recycling, within the polymer composition) with properties fit for consumer products, manufactured through processes such as for example blow-molding and injection molding, and with a high impact strength and stiffness. The wt % is relative to the total weight of the polymer composition, if not stated otherwise.

The source of materials for polymer composition of recycled polymer material can be food and household goods packaging, e.g. polyolefin plastics (such as for example PP) that can be contaminated by other polymer families, such as for example styrene polymers.

Styrene polymers are used in the production of packaging and containers for perishable foods, in the form of polystyrene (PS); in the production of industrial packaging, in the form of acrylonitrile butadiene styrene (ABS); in the production of packaging, containers and as fillers for packaging and containers, in the form of expanded polystyrene (EPS). Thus, styrene polymers need to be removed during the processing of the to be recycled materials. A complete removal is technically and economically not possible. But any remaining residual polystyrene has a significant negative impact on the mechanical properties of the recycled PP polymer composition. EPS for example accelerates radical generation and therewith material degradation, and renders articles manufactured more brittle. Further, polyethylene terephthalate (PET) has a negative impact on the mechanical properties of the polymer composition.

Polyvinyl chloride (PVC), polyvinylidene chloride (PVDC) and styrene polymers are considered to be only partially compatible with PP, especially when recycling to produce a new recycled PP using extrusion.

The coexistence of significant percentages of other polymer contaminants together with PP coming from recycled packaging has to be accepted, in order to make available a polymer flake or granule from recycling at competitive costs with respect to virgin PP.

An additional problem in the use of recycled PP polymer compositions, particularly from recycled packaging, is the variability and poor consistency of the polymer in the feed. Thus, this variability and poor consistency is also found within the regenerated granule or flake and produced articles. This variability and poor consistency of the polymer leads to an aesthetically unacceptable surface and inconstant mechanical properties of the final products. At the same time, the use of said granules in injection molding processes is limited or prevented by the extreme brittleness, low impact strength and stiffness, of granules or flakes and products obtained from recycling.

SUMMARY OF THE INVENTION

It is an object of the present invention to solve at least one of the above-listed problems. Further object of the invention is to obtain a polymer composition that can be efficiently used in the molding processes, particularly injection molding, wherein the percentage of recycled PP within the polymer composition is high, i.e. at least 75 wt %, preferably 80 wt %, more preferably 85 wt % of PP that is from recycling, in the polymer composition. The polymer composition can be used to produce flakes or granules and products at competitive costs with high impact strength and stiffness, when compared to virgin PP products. The polymer composition can produce a product that has a high impact strength (Charpy) and has increased stability upon exposure to environment.

The inventors have invented a polymer composition comprising:
  a) 75-90 wt % of a recycled polypropylene;
  b) 1-20 wt % of a polyolefin elastomer (POE);
  c) 0-10 wt % of a styrene ethylene butylene styrene block copolymer (SEBS);
  d) 2-20 wt % of talcum;
wherein the amount of POE and SEBS is at least 3.5 wt %, preferably between 5 and 20 wt % and wherein the wt % is relative to the total weight of the polymer composition.

The recycled PP polymer composition according to the invention has an increased impact strength and stiffness compared to standard recycled PP polymer compositions, despite contamination with other polymers. The polymer composition of the invention can have a melt flow rate (MFR) sufficient for efficient injection molding. Further, the invention can allow for controlled shrinkage during and/or after processing.

Advantages of the invention are usability of the polymer composition for molding, especially injection molding, increased MFR, reduced need for peroxides, increased impact strength and stiffness relative to other recycled PP polymer compositions.

DETAILED DESCRIPTION OF THE INVENTION

The polymer composition preferably comprises a high amount of a recycled polypropylene, a polyolefin elastomer and further preferably a styrene ethylene butylene styrene block copolymer, talcum and optionally additives.

Recycled Polypropylene

The PP raw material comprises plastic waste, predominantly post-consumer waste (PCW) PP packaging waste, such as for example detergent and shampoo bottles, dairy pots and meat trays, etc. The PP raw material waste can be pre-sorted by waste management companies. One suitable PP source can for example be the waste material collected under the DSD 324 (05-2012) and DSD 324-1 standard (03-2018). The PP DSD 324 (05-2012) raw material can comprise at least one of the following used, residue-drained, rigid, system-compatible items made of polypropylene, e.g. bottles, cups and trays, incl. secondary components such as lids, labels etc. The PP DSD 324 (05-2012) raw material can comprise a maximum total amount of impurities 6% by mass. The impurities in the PP DSD 324 (05-2012) raw material can comprise other metal items <0.5% by mass, rigid PE items <1% by mass, expanded plastics incl. EPS items <0.5% by mass, plastic films <2% by mass and other residues <3% by mass. Further examples of impurities in PP DSD 324 (05-2012) raw material can comprise glass, paper, board, cardboard, composite paper/cardboard materials (e.g. liquid packaging boards), aluminised plastics, other materials (e.g. rubber, stones, wood, textiles, nappies) and compostable waste (e.g. food, garden waste).

A second standard for recycled PP is the PP DSD 324-1 standard (03-2018). This standard is very comparable to the PP DSD 324 standard discussed above, except that the recycled PP can contain more film material, up to about 10 wt %. This film material comprises both recycled PP film (such as for example bioriented PP (BOPP)) PE film. The PP DSD 324-1 standard (03-2018) raw material can comprise a maximum total amount of impurities 4% by mass. The impurities in the PP DSD 324-1 standard (03-2018) raw material can comprise other metal items <0.5% by mass, rigid PE items <1% by mass, expanded plastics incl. EPS items <0.5% by mass, paper, cardboard, carton, composite paper/cardboard materials (e.g. liquid packaging boards) <1% by mass, other residues <3% by mass. Further examples of impurities in PP DSD 324-1 standard (03-2018) raw material can comprise glass, aluminised plastics, other materials (e.g. rubber, stones, wood, textiles, nappies) and compostable waste (e.g. food, garden waste).

Examples of recycled PP are EXPP152A (MFR 15)/300P and EXPP163A (MFR 50)/300T.

Optical sorting can also be used to remove unwanted polymers, but polystyrene or polyethylene (PE) contamination in the feed still occurs and has a substantial negative impact on the mechanical properties of the recycled polymer composition.

PP is available in three different varieties, PP homopolymers (PPh), PP random copolymer (PPr) and PP impact copolymer (or heterophasic PP copolymer, PPc).

The waste material can for example be characterized as originating from following sources (a) extrusion sheet and film material, mostly PP homopolymers (PPh) and PP random copolymers (PPr), virtually without rubber (such as for example biaxially-oriented polypropylene (BOPP)); and (b) injection molded material, which are a mix of PP homopolymer (PPh), PP random copolymers (PPr) and impact copolymer (PPc), containing about 15 wt % rubber.

The recycled PP can contain approximately half of packaging material (BOPP) and half of rubber-containing injection molded material. This injection molded material can contain rubbers, such as for example C2-C3 rubber, thermoplastic elastomers (TPE), ethylene propylene diene methylene (EPDM) or ethylene propylene rubber (EPR).

The resulting mix of the recycled PP itself used in the polymer composition can for example have a rubber content of between 1.5-12 wt % (rubber from rubber-containing injection molded material; wherein wt % is relative to the total amount of the mix of the recycled PP). On top of the rubber from the rubber-containing injection molded material additional rubber has been added to the polymer composition. The additional rubber comprises at least POE and preferably SEBS.

The recycled PP content of the polymer composition is preferably made-up of between 25-75 wt % BOPP and between 25-75 wt % rubber-containing injection molded material; wherein wt % is relative to the total amount of recycled PP.

The recycled PP is present between 75-90 wt %, preferably between 80-86 wt %, within the polymer composition; wherein wt % is relative to the total weight of the polymer composition.

Additional Rubber

The recycled PP contains already rubber, as mentioned above. Besides this rubber, the composition comprises at least 3.5 wt % of another rubber component. The another rubber component comprises at least a polyolefin elastomer (POE), and preferably a SEBS rubber. These two types of rubber have been surprisingly found to improve the impact strength of the final product produced using the polymer composition of the invention. The amount of POE and SEBS is at least 3.5 wt %, preferably between 5 and 20 wt %, more preferably between 8 and 15 wt %.

The polymer composition preferably has a total rubber content (rubber present in the recycled PP and additional rubber) of between 5-30 wt %, more preferably between 10-25 wt %, most preferably between 12-20 wt %, as determined with cold xylene solubles (CXS).

Polyolefin Elastomer

The polymer composition comprises a polyolefin elastomer (POE) which is an ethylene alpha olefin copolymer. Examples of POE are C2-C4 copolymers, C2-C6 copolymers and C2-C8 copolymers.

The POE can preferably be a C2-C6 copolymer or a C2-C8 copolymer with between 70-80 wt % ethylene, more preferably between 73-78 wt %, most preferably between 74-77 wt %; wherein wt % ethylene is relative to the POE.

The POE used in the invention preferably comprises an ethylene (C2) octene (C8) metallocene rubbers with a blocky structure.

The POE preferably has a density of between 0.85-0.89, more preferably between 0.855-0.885, most preferably between 0.86-0.875.

The POE preferably has an MFR of between 0.3-1, more preferably between 0.4-0.7, most preferably between 0.45-0.6 (190° C., 2.16 kg).

The added C2-C8 rubber can match the C2-C3 rubber in the injection molded materials. This has a surprisingly positive effect on the impact strength of the polymer composition.

The addition was further found to also surprisingly increase the stiffness. The C2-C8 rubber can also increase flow or allow for reduction in use of the peroxide in the process.

The POE is preferably selected from the group of Infuse or Engage polymers, such as for example Infuse 9107, Infuse 9077 and Engage XLT8677.

The POE is present at between 1-20 wt %, preferably between 2-15 wt %, within the polymer composition.

Styrene Ethylene Butylene Styrene Block Copolymer

The second type of additional rubber of the polymer composition (which is preferably present) is a SEBS rubber.

SEBS rubbers are (partly) hydrogenated styrene-butadiene-styrene block copolymers. They belong to the family of styrenic block copolymers (SBC). These polymers are tri-block copolymers, having styrene at both extremities of the polymer chain with an internal polybutadiene, polyisoprene or hydrogenated polybutadiene or polyisoprene block.

SEBS copolymers are commercially available, for example under the tradenames of Kraton and Tuftec, such as for example Kraton SEBS G1657MS.

The SEBS copolymer surprisingly reduces the negative impact of for example EPS or PET, on the mechanical properties of the polymer composition, such as for example the impact strength.

The SEBS is present between 0-10 wt %, preferably between 0.5-6 wt %, more preferably between 1-5 wt %, most preferably between 1.5-4.5 wt %, within the polymer composition.

Talcum

The talcum can for example be unmodified and does preferably not have a surface coating or surface treatment. Talcum may also be referred to as talcum in the present application. Talcum can for example be an alpha nucleating agent, such as for example hydrated magnesium-silicate or Steamic 00S DF.

Preferably the talcum is a very finely ground talcum. The inventors found that use of a fine talcum having a 050 of less than 4 micron, preferably less than 3 micron, even more preferably less than 2.5 micron gives an increase in impact and tensile modulus in combination with a recycle PP. The 050 is measured by sedigraph, sedimentation analysis, Stokes Law (ISO 13317-3).

The talcum increases the stiffness and strength of the polymer composition and produced articles. The talcum content further impacts the flow of the polymer composition in the molding process, especially in regards to thin walled applications.

The talcum is present at between 2-20 wt %, preferably between 2-17 wt %, or between 3-10 wt %, within the polymer composition.

Additives

The polymer composition can further comprise between 0.05-10 wt %, preferably 0.1-8 wt %, of additives, within the polymer composition.

Additives comprise polyethylenes (for example virgin HOPE or recycled HDPE), maleic anhydride grafted PEs (PEMA), maleic anhydride grafted PPs (PPMA), stabilizers, peroxides, calcium oxides (CaO) or colorants.

The amount of recycled HOPE is preferably less than 8 wt %, more preferably less than 7 wt % or less than 5 wt % relative to the weight of the polymer composition.

Examples of PE are High-Density PE (HDPE), Low-Density PE (LDPE) and Linear Low-Density PE (LLDPE).

A PP compatible acid having a polar group can be added, such as for example a PPMA.

A PEMA, PE or PPMA can for example be added to the polymer composition between 0.1-2 wt %, preferably between 0.2-1 wt %, more preferably between 0.4-0.8 wt %.

A stabilizer can be added, such as for example masterbatches like Tosaf ME 833848, which is a blend of about 70 wt % LDPE with a phenolic stabilizer Organox B225) and an Irgafos. Typically, such a masterbatch is added in an amount between 0.2 and 1.5 wt %, preferably between 0.3 and 1.2 wt %.

A peroxide, in the form of an organic compound or masterbatch can be added. The peroxide improves the flow of the material and can be used to achieve a desired melt flow.

The peroxide can for example be selected from the group of Zebraflow T028, Zebraflow T0214 or Zebraflow T0318, which are masterbatches of a peroxide with a polyolefin. For example, between 0-2 wt % of a masterbatch can be added, wherein this masterbatch can for example contain between 2-10 wt % of a suitable peroxide.

A CaO can be added to inhibit release of HCl. The CaO can be also added as a masterbatch with for example LDPE. CaO can for example be added in a range between 0-2 wt %.

A black colorant can for example be added to the polymer composition between 0.1-5 wt %, preferably between 1-2 wt % in the form of a masterbatch blend.

Composition

The polymer composition preferably has a melt flow rate MFR (230° C., 2.16 kg) of between 5-25 g/10 min, more preferably between 12-18 g/10 min and/or preferably an MVR (230° C., 2.16 kg) of between 5-30 ml/10 min, more preferably between 15-25 ml/10 min.

The polymer composition preferably has a modulus ranging between 800-1400 MPa, preferably between 810-1300 MPa.

The polymer composition preferably has a Charpy notched impact strength of between 5-20 $kJ/m^2$, more preferably between 8-15 $kJ/m^2$.

The polymer composition preferably consists of
a. 75-90 wt % of a recycled polypropylene;
b. 1-20 wt % of a polyolefin elastomer (POE);
c. 0.5-6 wt % of a styrene ethylene butylene styrene block copolymer (SEBS);
d. 2-20 wt % of talcum;
e. 0-10 wt % of additives,
wherein the amount of POE and SEBS is at least 3.5 wt %, preferably between 5 and 20 wt %, and wherein the wt % is relative to the total weight of the polymer composition.

More preferably the polymer composition consists of
a. 75-90 wt % of a recycled polypropylene;
b. 5-15 wt % of a polyolefin elastomer (POE);
c. 1-5 wt % of a styrene ethylene butylene styrene block copolymer (SEBS);
d. 2-17 wt % of talcum;
e. 0-10 wt % of additives,
wherein the amount of POE and SEBS is between 8 and 15 wt %, and wherein the wt % is relative to the total weight of the polymer composition.

Process

The invention further relates to a process for preparing the polymer composition of the invention.

This process comprises the steps of
a) treating a mixed polyolefin recyclate fraction with water without added thermal energy;
b) treating the solution obtained mixed polyolefin recyclate fraction from a) in a washing step with an alkaline medium at a temperature of at least 60° C.;
c) sorting of the mixed polyolefin recyclate fraction solution obtained from b) obtaining a mixed PP recyclate fraction, wherein steps a) and b) can also be carried out in the reverse order;
d) treating the mixed PP recyclate fraction solution obtained from the above steps at a temperature in the range of between 50-155° C., preferably for a period of at least 60 minutes;
e) adding the dried mixed PP recyclate fraction obtained from step d) to an extruder with the addition of the POE, SEBS and talcum; optionally additives;
wherein the mix is processed to obtain a recycled PP material;
wherein step e) is conducted between 200-250° C., preferably between 210-240° C., more preferably between 220-230° C. for between 1-10 minutes.

The process of making the polymer composition may comprise compounding and extruding.

The process of making the polymer composition may use a co-rotating twin screw tandem extruder to which the recycled polypropylene, styrene ethylene butylene styrene block copolymer, polyolefin elastomer, talcum and optionally additives are added.

Additives can be added in a reclaim extruder (first extruder) and a compounding extruder (second extruder) of a tandem extruder.

Articles

The polymer composition can be presented in granule or flake form to be used for manufacturing articles.

The polymer composition of recycled PP is suitable for manufacturing products for long-term use, such as for example boxes, trays, paint pails or consumer goods.

The articles made from the polymer composition are preferably formed by injection molding or blow-molding.

EMBODIMENTS

In a preferred embodiment the polymer composition comprises between 75-90 wt % of a recycled polypropylene, between 0.1-1.9 wt % of a styrene ethylene butylene styrene block copolymer, between 1-20 wt % of a polyolefin elastomer and between 2-20 wt % of talcum.

In another embodiment the polymer composition comprises between 80-86 wt % of a recycled polypropylene, between 0.5-1.5 wt % of a styrene ethylene butylene styrene block copolymer, between 2-15 wt % of a polyolefin elastomer and between 3-10 wt % of talcum.

In another embodiment the polymer composition is preferably used for injection molding of articles.

The polymer composition according to the invention may further comprise optional components different from the previously mentioned components of the polymer composition, such as additives, wherein the total of the previously mentioned components and the optional components is 100 wt % of the total polymer composition.

Accordingly, the invention relates to a polymer composition consisting of the previously mentioned components and the optional components.

It is noted that the invention relates to all possible combinations of features described herein, preferred in particular are those combinations of features that are present in the claims. It will therefore be appreciated that all combinations of features relating to the polymer composition according to the invention; all combinations of features relating to the process according to the invention and all combinations of features relating to the polymer composition according to the invention and features relating to the process according to the invention are described herein.

It is further noted that the term 'comprising' does not exclude the presence of other elements. However, it is also to be understood that a description on a product/polymer composition comprising certain components also discloses a product/polymer composition consisting of these components. The product/polymer composition consisting of these components may be advantageous in that it offers a simpler, more economical process for the preparation of the product/polymer composition. Similarly, it is also to be understood that a description n a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Quality Testing and Standards

For quality testing samples are taken during processing and from the end product. The Melt Mass-Flow Rate (MFR) is measured at day 3 and day 10 of ageing. The MFR and Melt Volume-Flow Rate (MVR) are assessed using the ISO 1133-1:2011, 2.16 kg, T=230° C. For POE the MFR and MVR are assessed using the ISO 1133-1:2011 at 190° C. under 2.16 kg.

The cold xylene solubles (CXS) is measured using the ISO 16152:2005, T=25° C.

The ash content of the polymer composition or product is measured using the 1503451-1 2008.

The density of the polymer composition or product is measured using the ISO 1183-1:2012, T=23° C., tensile bar.

The tensile strength/test of the polymer composition or product is measured using the ISO 527-2:2012, T=23° C., II.

The flexural of the polymer composition or product is measured using the ISO 178:2010, T=23° C., II.

The tensile bar test of the molded articles from the polymer composition or product is measured using the ISO 527-2:2012.

The Charpy of the molded articles from the polymer composition or product is measured using the ISO 179-1:2010 (T=−20° C. and T=23° C., II, molded bar 527/1A—notched) and ISO 179-1:2010 (T=−20° C. molded bar 527/1A—unnotched).

The polydispersity was assessed using the polymer Labs 220 gel permeation chromatograph (GPC). The software used is Cirrus from PolyLab for molecular weights from GPC. The calibration of the HT-GPC uses a Hamielec type calibration with broad standard and fresh calibration with each sample set.

Extrusion products and injection-molded articles are produced and assessed following 15019069-2:2016, 150294-1:2017 and 150294-3:2002.

EXAMPLES

| | | Sample Material Batch Nr palletbox | | | | | |
|---|---|---|---|---|---|---|---|
| | | CE-A | CE-B | CE-C | CE-D | CE-E | ex 1 |
| Processing | | | | | | | |
| EXPP152A (MFR 15) 300P | | 99.6 | 99.1 | 95.8 | 89.8 | 79.8 | |
| EXPP163A (MFR 50) 300T | | | | | | | 89.6 |
| DOW Infuse 9077 | | | | | | | 5.0 |
| Kraton G1567MS | | | | | | | |
| Steamic OOSd (talc) | | | 0.5 | 4.0 | 10.0 | 20.0 | 5.0 |
| EBA wax | | 0.2 | 0.2 | | | | 0.2 |
| Irganox B225 | | 0.2 | 0.2 | 0.2 | 0.2 | 0.2 | 0.2 |
| Testing | | | | | | | |
| Aging before testing (HDPE 3 d/PP 14 d) | days | 14 | 14 | 14 | 14 | 14 | 14 |
| Density ISO 1183 (T = 23° C.) | — | | | | | | |
| Density Average | kg/m$^3$ | | | 943 | 984 | 1055 | 943 |
| Melt Flow ISO 1133 (I 2.16; 230 C.) | — | | | | | | |
| MFR | g/10 min | 16.7 | 16 | 12.1 | 12.7 | 12.7 | 41.4 |
| MVR | ml/10 min | 22.8 | 21.8 | 15.6 | 15.7 | 14.5 | 53.6 |
| Meltdensity | g/ml | | | 0.776 | 0.809 | 0.876 | 0.772 |
| Ash Content compounds | — | | | | | | |
| Ash content | % | | | 6.09 | 11.93 | 21.44 | 6.04 |
| Charpy ISO 179/1eA (T = 23° C., II) molded bar 527/1A | date | | | | | | |
| Breaktype (C/P/N) | — | | | 5xC | 5xC | 5xC | 5xC |
| Charpy impact | kJ/m$^2$ | 5.2 | 4.8 | 4.75 | 4.13 | 3.75 | 5.68 |
| Charpy ISO 179/1eA (T = −20° C., II) molded bar 527/1A | date | | | | | | |
| Breaktype (C/P/N) | — | | | 5xC | 5xC | 5xC | 5xC |
| Charpy impact | kJ/m$^2$ | | | 1.68 | 1.67 | 1.51 | 2.56 |
| Tensile ISO 527/1A (T = 23° C., II) | date | | | | | | |
| E-Modulus (Chord 0.05%-0.25%) | N/mm$^2$ | 1260 | 1323 | 1551 | 1877 | 2441 | 1291 |
| Tensile Strain at Break (Elongation at Break) | % | | | 33.0 | 11.4 | 8.9 | 46.6 |
| Tensile Strain at Yield (Elongation at yield) | % | | | 7.6 | 6.5 | 5.2 | 6.6 |
| Tensile stress at Break | N/mm$^2$ | | | 13.8 | 23.3 | 23.9 | 13.0 |
| Yield Stress | N/mm$^2$ | | | 28.1 | 28.0 | 28.2 | 23.2 |

| | | Sample Material Batch Nr palletbox | | | | |
|---|---|---|---|---|---|---|
| | | ex 2 | ex 3 | ex 4 | ex 5 | ex 6 |
| Processing | | | | | | |
| EXPP152A (MFR 15) 300P | | | | 79.6 | 81.6 | 79.6 |
| EXPP163A (MFR 50) 300T | | 87.6 | 85.6 | | | |
| DOW Infuse 9077 | | 5.0 | 5.0 | 10.0 | 8.0 | 8.0 |
| Kraton G1567MS | | 2.0 | 4.0 | | 2.0 | 4.0 |
| Steamic OOSd (talc) | | 5.0 | 5.0 | 10.0 | 8.0 | 8.0 |
| EBA wax | | 0.2 | 0.2 | 0.2 | 0.2 | 0.2 |
| Irganox B225 | | 0.2 | 0.2 | 0.2 | 0.2 | 0.2 |
| Testing | | | | | | |
| Aging before testing (HDPE 3 d/PP 14 d) | days | 14 | 14 | 14 | 14 | 14 |
| Density ISO 1183 (T = 23° C.) | — | | | | | |
| Density Average | kg/m$^3$ | 943 | 941 | 972 | 959 | 958 |
| Melt Flow ISO 1133 (I 2.16; 230 C.) | — | | | | | |
| MFR | g/10 min | 39.9 | 39.4 | 13.34 | 13.9 | 14.1 |
| MVR | ml/10 min | 52.6 | 51.6 | 17.14 | 18.1 | 18.4 |

-continued

| | | | | | | |
|---|---|---|---|---|---|---|
| Meltdensity | g/ml | 0.759 | 0.764 | 0.778 | 0.768 | 0.766 |
| Ash Content compounds | — | | | | | |
| Ash content | % | 6.12 | 5.91 | 10.84 | 8.71 | 8.76 |
| Charpy ISO 179/1eA (T = 23° C., II) molded bar 527/1A | date | | | | | |
| Breaktype (C/P/N) | — | 5xC | 5xC | 5xC | 5xC | 4xH |
| Charpy impact | kJ/m$^2$ | 7.21 | 8.33 | 9.39 | 10.45 | 16.48 |
| Charpy ISO 179/1eA (T = −20° C., II) molded bar 527/1A | date | | | | | |
| Breaktype (C/P/N) | — | 5xC | 5xC | 5xC | 5xC | 5xC |
| Charpy impact | kJ/m$^2$ | 2.37 | 3.09 | 2.75 | 2.86 | 3.03 |
| Tensile ISO 527/1A (T = 23° C., II) | date | | | | | |
| E-Modulus (Chord 0.05%-0.25%) | N/mm$^2$ | 1230 | 1162 | 1434 | 1396 | 1313 |
| Tensile Strain at Break (Elongation at Break) | % | 45.4 | 53.4 | 90.2 | 17.9 | 79.3 |
| Tensile Strain at Yield (Elongation at yield) | % | 6.9 | 7.2 | 8.1 | 8.5 | 9.1 |
| Tensile stress at Break | N/mm$^2$ | 13.1 | 13.7 | 13.0 | 17.1 | 11.5 |
| Yield Stress | N/mm$^2$ | 22.4 | 21.4 | 22.7 | 23.2 | 22.4 |

What is claimed is:

1. A polymer composition comprising:
   75-90 wt % of a recycled polypropylene;
   1-20 wt % of a polyolefin elastomer (POE);
   0-10 wt % of a styrene-ethylene-butylene-styrene block copolymer (SEBS);
   2-20 wt % of talcum;
   wherein the amount of POE and SEBS is at least 3.5 wt %, and
   wherein the wt % is relative to the total weight of the polymer composition,
   wherein the recycled PP is a material collected under the DSD 324 or DSD 324-1 standard, and wherein the polymer composition has a modulus ranging between 800-1400 MPa determined using ISO 527-2:2012.

2. The polymer composition according to claim 1, wherein the recycled PP is present between 80-86 wt %.

3. The polymer composition according to claim 1, wherein the polymer composition has a total rubber content of between 5-15 wt %.

4. The polymer composition according to claim 1, wherein the POE is selected from a C2-C6 copolymer or a C2-C8 copolymer with between 70-80 wt % ethylene, wherein wt % is relative to the POE.

5. The polymer composition according to claim 1, wherein the POE comprises an ethylene (C2) octene (C8) metallocene rubber with a blocky structure.

6. The polymer composition according to claim 1, wherein the POE has a density of between 0.85-0.89; determined using ISO 1183-1:2012.

7. The polymer composition according to claim 1, wherein the POE has a melt flow rate MFR (190° C., 2.16 kg) between 0.3-1; determined using ISO 1133-1:2011.

8. The polymer composition according to claim 1, wherein the POE is between 2-15 wt %.

9. The polymer composition according to claim 1, wherein the SEBS is present between 0.5-6 wt %.

10. The polymer composition according to claim 1, wherein the composition comprises less than 8 wt % of a recycled high density polyethylene.

11. The polymer composition according to claim 1, wherein the talcum is present between 3-10 wt %.

12. The polymer composition according to claim 1, wherein the talcum is a fine talcum having a D50 of less than 4 micron (ISO 13317-3).

13. The polymer composition according to claim 1, wherein the polymer composition has a modulus ranging between 810-1300 MPa determined using ISO 527-2:2012.

14. The polymer composition according to claim 1, wherein the polymer composition has a Charpy notched impact strength of between 5-20 KJ/m2; determined using ISO 179-1:2010).

15. The polymer composition according to claim 1, wherein the polymer composition has a melt flow rate MFR (230° C., 2.16 kg) of between 5-25 g/10 min; determined using ISO 1133-1:2011.

16. Articles comprising the polymer composition according to claim 1, which are formed by injection molding.

* * * * *